(12) United States Patent
Maki et al.

(10) Patent No.: US 11,308,941 B2
(45) Date of Patent: Apr. 19, 2022

(54) NATURAL LANGUAGE PROCESSING APPARATUS AND PROGRAM

(71) Applicant: Nomura Research Institute, Ltd., Tokyo (JP)

(72) Inventors: Junichiro Maki, Tokyo (JP); Satoshi Tobita, Tokyo (JP); Shuichi Watanabe, Tokyo (JP); Yosuke Hori, Tokyo (JP); Jun Eijima, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 114 days.

(21) Appl. No.: 16/829,508

(22) Filed: Mar. 25, 2020

(65) Prior Publication Data

US 2021/0295830 A1 Sep. 23, 2021

(30) Foreign Application Priority Data

Mar. 19, 2020 (JP) .............................. JP2020-049602

(51) Int. Cl.
| | | |
|---|---|---|
| *G06F 16/00* | (2019.01) | |
| *G10L 15/18* | (2013.01) | |
| *G06F 40/40* | (2020.01) | |
| *G06F 40/30* | (2020.01) | |
| *G06F 16/22* | (2019.01) | |
| *G06F 16/33* | (2019.01) | |
| *G10L 15/08* | (2006.01) | |
| *G06F 16/24* | (2019.01) | |

(52) U.S. Cl.
CPC ...... *G10L 15/1815* (2013.01); *G06F 16/2237* (2019.01); *G06F 16/3347* (2019.01); *G06F 40/30* (2020.01); *G06F 40/40* (2020.01); *G06F 16/00* (2019.01); *G06F 16/24* (2019.01); *G06F 16/33* (2019.01); *G06F 16/3344* (2019.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 5,857,179 | A * | 1/1999 | Vaithyanathan | G06F 16/355 |
| 9,037,464 | B1 * | 5/2015 | Mikolov | G10L 15/06 |
| | | | | 704/255 |
| 10,360,303 | B2 * | 7/2019 | Volkovs | G06F 40/30 |
| 10,747,793 | B2 * | 8/2020 | Kataria | G06F 16/3326 |
| 2005/0234879 | A1 * | 10/2005 | Zeng | G06F 16/3322 |
| 2007/0038602 | A1 * | 2/2007 | Weyand | G06F 16/951 |

(Continued)

FOREIGN PATENT DOCUMENTS

| | | |
|---|---|---|
| JP | 2018-73429 A | 5/2018 |
| JP | 2019-149161 A | 9/2019 |

*Primary Examiner* — Richard Z Zhu
(74) *Attorney, Agent, or Firm* — Rankin, Hill & Clark LLP

(57) ABSTRACT

A natural language processing apparatus includes: a first calculation unit configured to calculate a distributed vector of a word included in a plurality of sentences based on a database that manages the plurality of sentences associated with a classification word; a second calculation unit configured to calculate a distributed vector of the sentence based on the distributed vector of the word included in each sentence; and a third calculation unit configured to calculate a distributed vector of the classification word based on the distributed vector of each sentence associated with the same classification word.

5 Claims, 23 Drawing Sheets

(56) References Cited

U.S. PATENT DOCUMENTS

| | | | |
|---|---|---|---|
| 2007/0203720 A1* | 8/2007 | Singh | G06Q 10/063 705/7.11 |
| 2012/0124044 A1* | 5/2012 | Bhattacharya | G06F 16/35 707/737 |
| 2012/0124050 A1* | 5/2012 | Yang | G06F 16/367 707/739 |
| 2012/0150532 A1* | 6/2012 | Mirowski | G06F 40/40 704/9 |
| 2012/0253792 A1* | 10/2012 | Bespalov | G06F 16/353 704/9 |
| 2016/0307566 A1* | 10/2016 | Bellegarda | G06N 3/0454 |
| 2017/0004208 A1* | 1/2017 | Podder | G06F 16/367 |
| 2017/0011289 A1* | 1/2017 | Gao | G06F 40/268 |
| 2017/0308613 A1* | 10/2017 | Zhu | G06F 16/9535 |
| 2018/0101570 A1* | 4/2018 | Kumar | G06F 16/24537 |
| 2019/0129998 A1* | 5/2019 | Kataria | G06F 16/2452 |
| 2019/0286703 A1* | 9/2019 | Mizobuchi | G06F 40/30 |

* cited by examiner

FIG. 2

| ENTERPRISE ID | ENTERPRISE NAME | BUSINESS CONTENT SENTENCE | BUSINESS CHARACTERISTIC WORD ID | MAIN BUSINESS TYPE ID | SUB-BUSINESS TYPE ID |
|---|---|---|---|---|---|
| C00001 | WHITE TIGER | IT SELLS CARS. IT HAS ITS OWN SALES NETWORK. | BK001 | IN001 | — |
| C00002 | RED ROSE | IT DISPATCHES A HELPER WHO CAN OFFER A CHAUFFEUR SERVICE. IT IS POPULAR WITH WEALTHY PEOPLE. | BK002 | IN002 | — |
| ... | ... | ... | ... | ... | ... |

FIG. 3

| BUSINESS CHARACTERISTIC WORD ID | BUSINESS CHARACTERISTIC WORD |
|---|---|
| BK001 | REGION |
| BK002 | HIGH CLASS |
| ⋮ | ⋮ |

FIG. 4

| BUSINESS TYPE ID | BUSINESS TYPE NAME |
|---|---|
| IN001 | CAR SALES BUSINESS |
| IN002 | HELPER DISPATCH BUSINESS |
| ⋮ | ⋮ |

FIG. 5

| WORD | WORD VECTOR |
|---|---|
| CAR | WORD VECTOR 1 |
| SALE | WORD VECTOR 2 |
| ⋮ | ⋮ |

FIG. 6

| ENTERPRISE ID | ENTERPRISE VECTOR |
|---|---|
| C00001 | ENTERPRISE VECTOR 1 |
| C00002 | ENTERPRISE VECTOR 2 |
| ⋮ | ⋮ |

FIG. 7

| BUSINESS CHARACTERISTIC WORD ID | BUSINESS CHARACTERISTIC WORD VECTOR |
|---|---|
| BK001 | BUSINESS CHARACTERISTIC WORD VECTOR 1 |
| BK002 | BUSINESS CHARACTERISTIC WORD VECTOR 2 |
| ⋮ | ⋮ |

FIG. 8

| BUSINESS TYPE ID | BUSINESS TYPE VECTOR |
|---|---|
| IN001 | BUSINESS TYPE VECTOR 1 |
| IN002 | BUSINESS TYPE VECTOR 2 |
| ⋮ | ⋮ |

FIG. 13

| WORD | SIMILARITY |
|---|---|
| BIKE | 0.79 |
| TAXI | 0.76 |
| BUS | 0.73 |
| TRUCK | 0.67 |
| TRANSPORTATION | 0.65 |
| RAILWAY | 0.62 |
| LICENSE | 0.58 |
| ACCIDENT | 0.54 |
| ⋮ | ⋮ |

FIG. 14

| BUSINESS CHARACTERISTIC WORD | SIMILARITY |
|---|---|
| SECOND-HAND | 0.78 |
| REPAIR | 0.75 |
| HIGH CLASS | 0.71 |
| QUALITY | 0.66 |
| PUBLIC | 0.64 |
| NEW PRODUCT | 0.61 |
| RAPIDITY | 0.57 |
| LOW PRICE | 0.55 |
| ⋮ | ⋮ |

FIG. 15

| BUSINESS TYPE | SIMILARITY |
|---|---|
| CAR SALES BUSINESS | 0.76 |
| CAR MAINTENANCE BUSINESS | 0.74 |
| CAR RENTAL BUSINESS | 0.72 |
| CAR MANUFACTURING BUSINESS | 0.68 |
| TRANSPORTATION BUSINESS | 0.65 |
| REAL ESTATE BUSINESS | 0.63 |
| ROAD MAINTENANCE BUSINESS | 0.59 |
| TIRE MANUFACTURING BUSINESS | 0.56 |
| ⋮ | ⋮ |

NATURAL LANGUAGE PROCESSING APPARATUS AND PROGRAM

BACKGROUND

Technical Field

The present invention relates to a technique of a distributed representation of a natural language.

Related Art

Based on a database that manages sentences, tags are attached to the sentences to classify the sentences. The sentences with a common tag are contents belonging to the same classification, and similar sentences can be collected by extracting sentences using the tags as keywords. That is, the tag is a classification word of the sentence and functions as a search condition, for example.

In addition, a distributed representation technique for representing a meaning of a word, a phrase, or a sentence as a high-dimensional real number vector has been widely used in natural language processing. The real number vector is referred to as a distributed vector. When the distributed vector is used, a semantic comparison of a natural language can be performed.

CITATION LIST

Patent Literature

Patent Literature 1: JP 2019-149161 A
Patent Literature 2: JP 2018-073429 A

SUMMARY

When the tag is also represented as a distributed vector, it is possible to mathematically compare semantic relations between tags, or semantic relations between a tag and a sentence.

However, a tag name represents a meaning of a classification, and only represents an aspect of a purpose of a sentence such as a background or characteristic of a classified sentence. However, even in a case where a distributed vector of a word or a phrase that is a tag name is used as a distributed vector of a tag, a purpose of the sentence associated with the tag is not comprehensively represented.

The present invention has been completed based on recognition of the above problems. An object of the present invention is to calculate a distributed vector of a classification word comprehensively representing a purpose of a sentence associated with the classification word.

In one aspect of the present invention, a natural language processing apparatus includes: a first calculation unit configured to calculate a distributed vector of a word included in a plurality of sentences based on a database that manages the plurality of sentences associated with a classification word; a second calculation unit configured to calculate a distributed vector of the sentence based on the distributed vector of the word included in each sentence; and a third calculation unit configured to calculate a distributed vector of the classification word based on the distributed vector of each sentence associated with the same classification word.

According to the present invention, it is possible to calculate a distributed vector of a classification word comprehensively representing a purpose of a sentence associated with the classification word.

BRIEF DESCRIPTION OF DRAWINGS

FIG. 2 is a diagram illustrating a data structure of an enterprise table;

FIG. 3 is a diagram illustrating a data structure of a business characteristic word table;

FIG. 4 is a diagram illustrating a data structure of a business type table;

FIG. 5 is a diagram illustrating a data structure of a word table;

FIG. 6 is a diagram illustrating a data structure of an enterprise vector storage unit;

FIG. 7 is a diagram illustrating a data structure of a business characteristic word vector storage unit;

FIG. 8 is a diagram illustrating a data structure of a business type vector storage unit;

FIG. 13 is a diagram illustrating a data structure of a synonym list;

FIG. 14 is a diagram illustrating a data structure of a business characteristic word list;

FIG. 15 is a diagram illustrating a data structure of a business type list;

DETAILED DESCRIPTION

Figure 1:
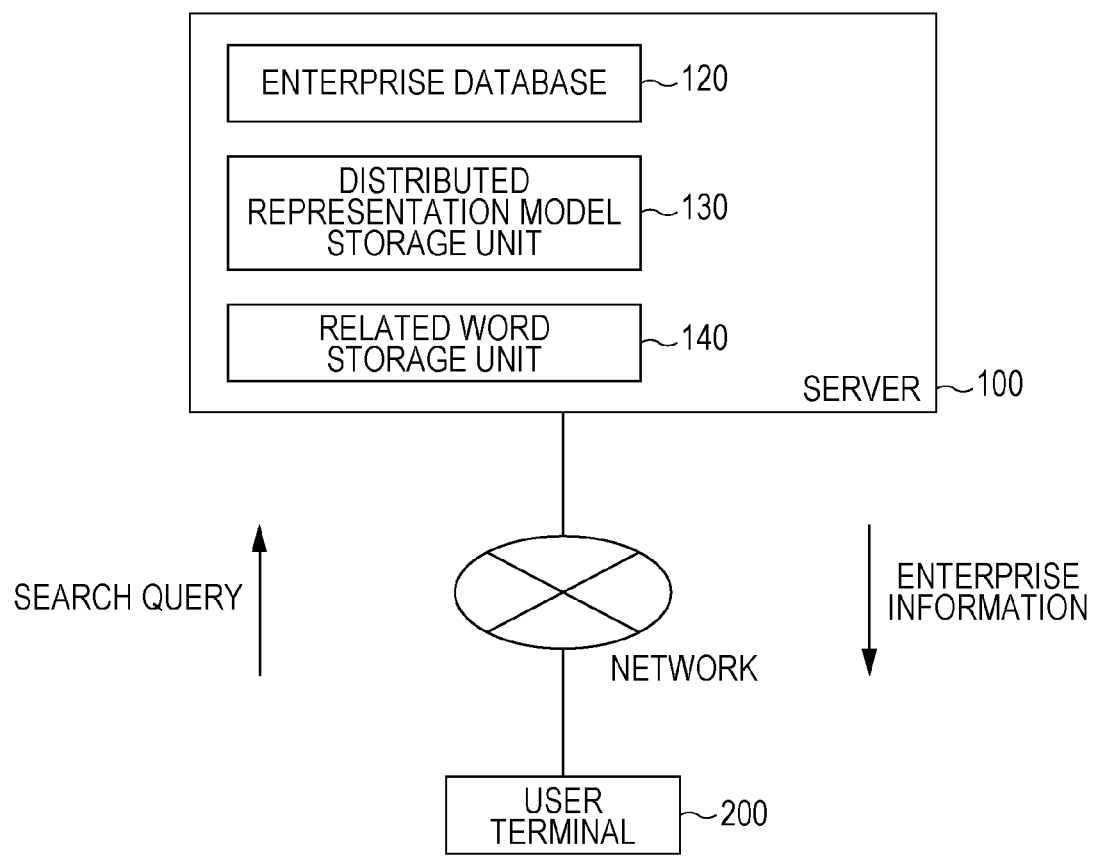
FIG. 1 is a diagram illustrating a network configuration of a search system according to the present exemplary embodiment.

FIG. 1 is a diagram illustrating a network configuration of a search system according to the present exemplary embodiment.

The search system according to the present exemplary embodiment includes a server 100 and a user terminal 200. The user terminal 200 is connected to the server 100 via a network (for example, Internet, a local area network (LAN), a dedicated line, or the like). The server 100 includes an enterprise database 120.

In a case where a user searches for enterprise information that is managed in the enterprise database 120, a search query is input to the user terminal 200 by a user operation, and the search query is transmitted to the server 100. Then, enterprise information extracted based on the search query is returned to the user terminal 200 and displayed on the user terminal 200.

In the present exemplary embodiment, a search function is enhanced by using a distributed representation model. In the distributed representation model, a word is represented as a high-dimensional real number vector. The distributed representation model is obtained by a learning process based on a database called a corpus, which is a large-scale integration of structured sentences of a natural language. This technique is well known in the natural language processing field. A real number vector of a word obtained by the distributed representation model may be referred to as a distributed vector or a word vector. Hereinafter, such a real number vector is referred to as a word vector.

As a representative example thereof, Word2vec is known. In the Word2vec, on the assumption that "words around which similar words appear are semantically close to each other", the problem of searching for other words appearing around a target word (for example, five words before and after the target word or ten words before and after the target word) of a sentence is solved. Here, the five words before and after the target word is in a range of a total of ten words including first to fifth words before the target word and first to fifth words after the target word. A neural network is used as a learning unit. In a learning process using a large corpus, word vectors of the words around which similar words appear are changed so as to have similar values with each other.

In the distributed representation model, the word vector can indicate not only a similar relationship between words but also a similar relationship between sentences. In the case of a sentence including a plurality of words, a sentence vector of the sentence is generated from word vectors of the words. In a case where a sentence vector of a certain sentence is similar to a sentence vector of another sentence, these sentences indicate that the contents thereof are similar to each other. In this case, the distributed representation model is stored in a distributed representation model storage unit 130.

In the present exemplary embodiment, a tag that is highly associated with a search query is selected based on a tag vector of a tag attached to a business content sentence of enterprise information. Then, a string indicating the tag is used as a condition for complementing the search query.

A general procedure thereof is divided into a preparation phase and a use phase. In the preparation phase, the distributed representation model is generated based on the enterprise database 120 by using the related art. That is, the word vector of the word in the enterprise database 120 is generated. Next, the tag vector of the tag used in the enterprise database 120 is generated and added to the distributed representation model. By doing so, the distributed representation model is expanded to a representation of the tag.

In the used phase, a specific search query is received, and a tag associated with the search query is selected with reference to the distributed representation model. Then, a character representation of the tag is used as a search condition. At this time, the character representation of the tag is selected as a related word, and then stored in a related word storage unit 140. Hereinafter, specific processing will be described.

FIG. 2 is a diagram illustrating a data structure of an enterprise table.

The enterprise table is managed in the enterprise database 120. The enterprise table has a record for each enterprise. An enterprise ID, an enterprise name, a business content sentence, a business characteristic word ID, a main business type ID, a sub-business type ID, and the like are set in the record of the enterprise table. In a field of the business content sentence, only one sentence may be set, or a plurality of sentences may be set. A business characteristic word and a business type correspond to a tag. In this case, the number of tags for the business type per enterprise can be set up to 2. In a case where only one tag for the business type is set, the main business type is used. The enterprise table is prepared before the preparation phase.

FIG. 3 is a diagram illustrating a data structure of a business characteristic word table.

The business characteristic word table is managed in the enterprise database 120. The business characteristic word table has a record for each business characteristic word. A business characteristic word ID and a business characteristic word are set in the record of the business characteristic word table. The business characteristic word table is prepared before the preparation phase.

FIG. 4 is a diagram illustrating a data structure of a business type table.

The business type table is managed in the enterprise database 120. The business type table has a record for each business type. A business type ID and a business type name are set in the record of the business type table. The business type table is prepared before the preparation phase.

FIG. 5 is a diagram illustrating a data structure of a word table.

The word table is included in the distributed representation model. The word table has a record for each word. A word and a word vector are set in the record of the word table. The word table is generated in the preparation phase.

FIG. 6 is a diagram illustrating a data structure of an enterprise vector storage unit.

An enterprise vector corresponds to a distributed representation vector of the business content sentence of an enterprise itself. The enterprise vector is generated from the word vector of the word included in the business content sentence. The enterprise vector storage unit is included in a distributed representation model storage unit 130. The enterprise vector is calculated in the preparation phase. The enterprise vector is based on calculations of a business characteristic word vector and a business type vector.

FIG. 7 is a diagram illustrating a data structure of a business characteristic word vector storage unit.

The business characteristic word vector indicates a practical meaning of the business characteristic word. The business characteristic word vector is generated from the enterprise vector of the enterprise that is set by the business characteristic word, and is different from the word vector of the word (for example, "region") corresponding to the business characteristic word. An operational characteristic that a meaning of a business characteristic word is determined depending on to which enterprise the business characteristic word is actually likely to be set is digitized by the business characteristic word vector. The business characteristic word vector is calculated in the preparation phase.

The business characteristic word vector storage unit stores the business characteristic word ID and the business characteristic word vector in association with each other. The business characteristic word vector storage unit is included in the distributed representation model storage unit 130. The business characteristic word ID is an example of a tag ID. The business characteristic word vector is an example of a tag vector.

FIG. 8 is a diagram illustrating a data structure of a business type vector storage unit.

The business type vector indicates a practical meaning of a business type tag. The business type vector is generated from the enterprise vector of the enterprise set by the business type tag, and is different from a meaning vector of a phrase (for example, "car sales business") corresponding to the business type name. An operational characteristic that a meaning of a business type tag is determined depending on to which enterprise the business type tag is actually likely to be set is digitized by the business type vector. The business type vector is calculated in the preparation phase.

The business type vector storage unit stores the business type ID and the business type vector in association with each other. The business type vector storage unit is included in the distributed representation model storage unit 130. The business type ID is an example of a tag ID. The business type vector is an example of a tag vector.

Figure 9:
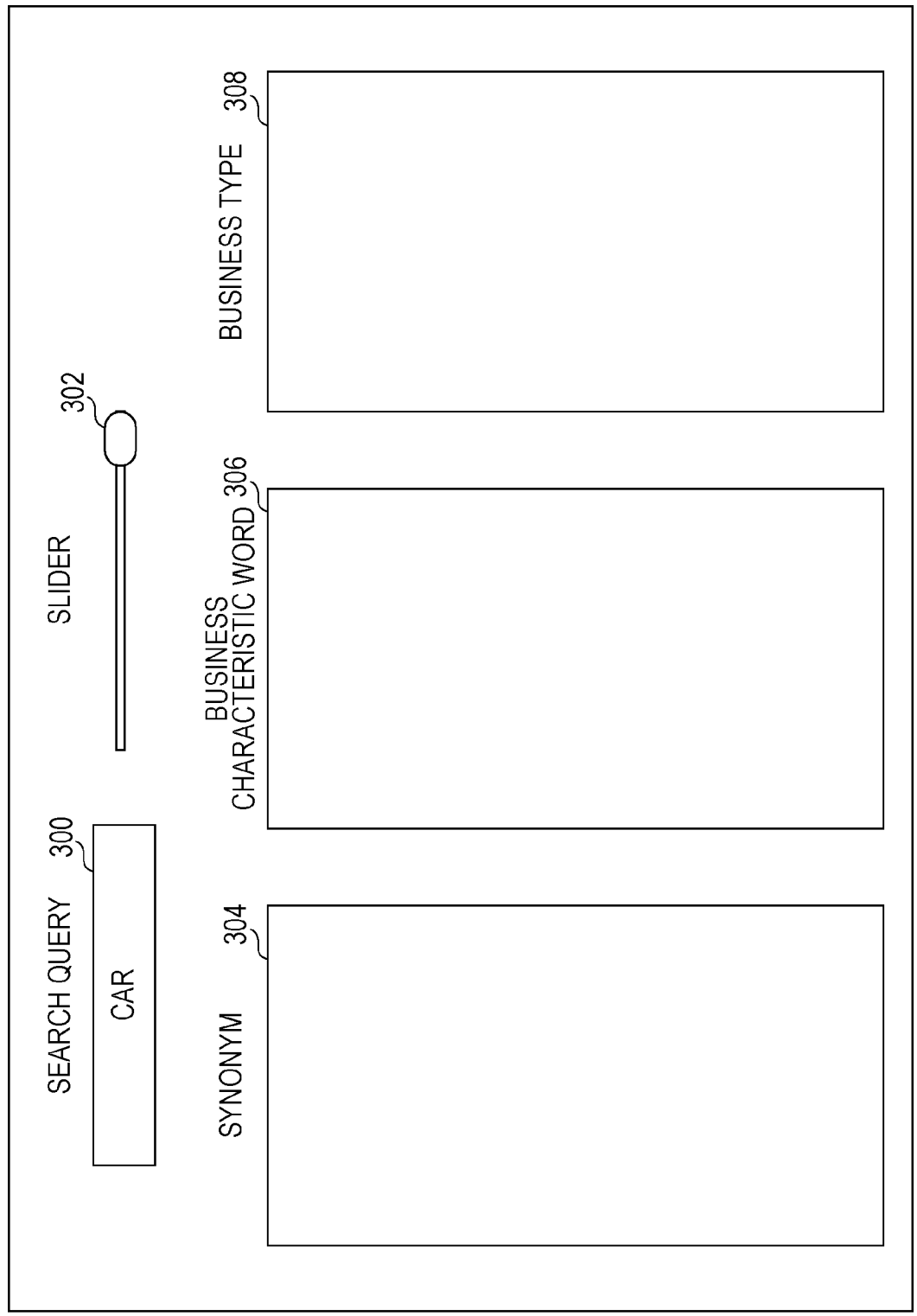
FIG. 9 is a diagram illustrating a search query input screen.

FIG. 9 is a diagram illustrating a search query input screen.

The search query input screen is generated by the server 100 and is displayed on the user terminal 200. The search query input screen includes a slider 302, a display area 304 for a synonym, a display area 306 for a business characteristic word, and a display area 308 for a business type, in addition to an input area 300 for a search query.

A synonym of which a similarity to a word input as a search query is equal to or higher than a reference value is displayed on the display area 304 for a synonym. The synonym is selected from all of the words included in the business content sentence. The reference value is defined as a first reference value. A business characteristic word of which a similarity to a word input as a search query is equal to or higher than a reference value is displayed on the display area 306 for a business characteristic word. The reference value is defined as a second reference value. The business characteristic words are set in advance. Among them, a business characteristic word similar to the search query is selected. A business type of which a similarity to a word input as a search query is equal to or higher than a reference value is displayed on the display area 308 for a business type. The reference value is defined as a third reference value. The business types are also set in advance. Among them, a business type similar to the search query is selected.

A slider value indicated by the slider 302 indicates the first reference value, the second reference value, and the third reference value. In this case, when the slider value is a maximum value, the first reference value, the second reference value, and the third reference value each are also a maximum value. A synonym of which a similarity to "car" is equal to or higher than the first reference value, a business characteristic word of which a similarity to "car" is equal to or higher than the second reference value, and a business type of which a similarity to "car" is equal to or higher than the third reference value do not exist, and neither of them are displayed. In this case, a search is performed by the search query input to the input area 300.

Figure 10:
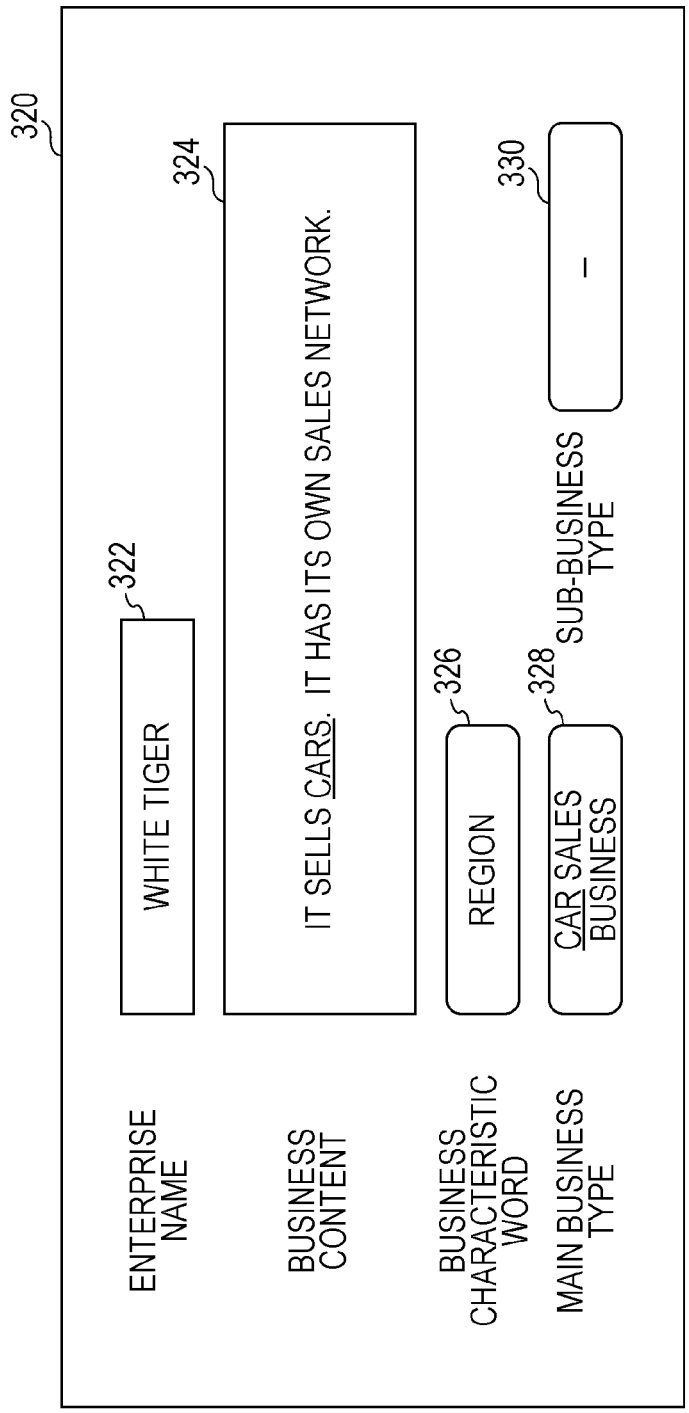
FIG. 10 is a diagram illustrating an enterprise information box included in a search result screen.

FIG. 10 is a diagram illustrating an enterprise information box included in a search result screen.

FIG. 10 illustrates the enterprise information box displayed as a search result in the state of FIG. 9. Enterprise information including "car" in texts of the business content sentence, a business characteristic word name, a main business type name, and a sub-business type name is extracted from the enterprise database 120. An enterprise name included in the extracted enterprise information is displayed in the display area 322. The business content sentence of the enterprise is also displayed in the display area 324. The business characteristic word of the enterprise is also displayed in the display area 326. The main business type of the enterprise is also displayed in the display area 328. The sub-business type of the enterprise is also displayed in the display area 330. In addition to such a case, in the case of enterprise information including "car", a box list is displayed on the search result screen. The search result screen is displayed in parallel with the search query input screen below the search query input screen. When a search query is input, a search is automatically performed and the search result screen is displayed.

Figure 11:
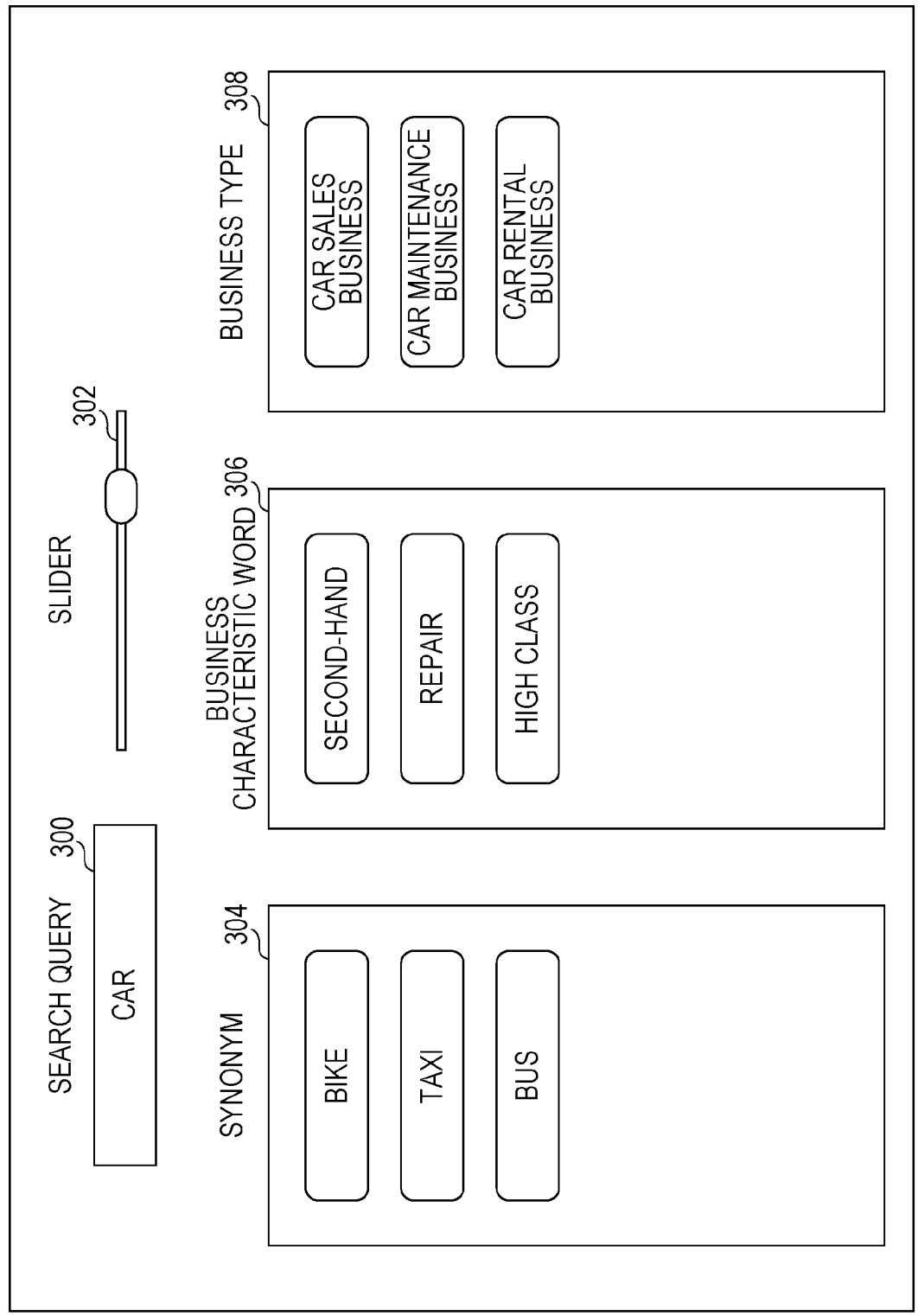
FIG. 11 is a diagram illustrating a search query input screen.

FIG. 11 is a diagram illustrating a search query input screen when a slider value is set to be small.

When the slider value is set to be small through an operation of the slider 302 by a user, the first reference value, the second reference value, and the third reference value are reduced, and a synonym, a business characteristic word, and a business type that satisfy the condition are displayed.

For example, a similarity between a word vector of "car" and a word vector of "bike" is equal to or higher than the first reference value indicated by the slider value in this case. A similarity between the word vector of "bike" and a business characteristic word vector of "second-hand" is equal to or higher than the second reference value indicated by the slider value in this case. In addition, a similarity between the word vector of "bike" and a business type vector of "car sales business" is equal to or higher than the third reference value indicated by the slider value in this case.

Here, the displayed synonym, business characteristic word, and business type are added as an OR condition in the search for enterprise information. Enterprise information including "bike", "second-hand", or "car sales business" in the texts of the business content sentence, the business characteristic word name, the main business type name, and the sub-business type name is extracted from the enterprise database 120.

Figure 12:
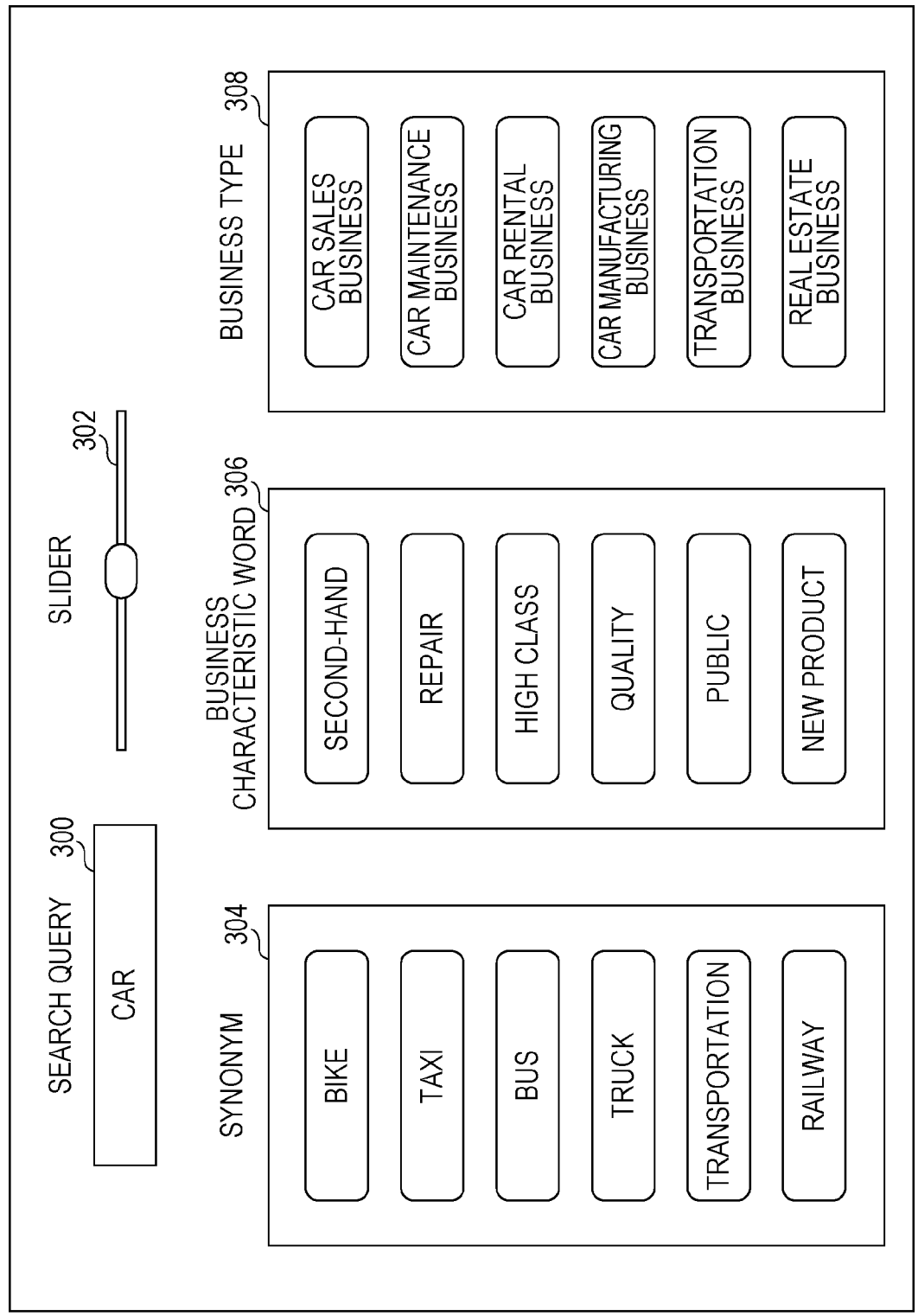
FIG. 12 is a diagram illustrating a search query input screen.

FIG. 12 is a diagram illustrating a search query input screen when a slider value is set to be smaller.

When the slider value is set to be smaller through an operation of the slider 302 by a user, the first reference value, the second reference value, and the third reference value are further reduced, and the numbers of synonyms, business characteristic words, and business types that satisfy the condition are increased.

"Truck", "quality", and "car manufacturing business" that are added by the operation are also added as an OR condition in search for enterprise information.

As such, a degree of association with the search query is adjusted by the operation of the slider 302, thereby increasing and reducing the numbers of synonyms, business characteristic words, and business types to be added to the search condition. As a result, comprehensiveness of the search for enterprise information can be adjusted. In the above example, comprehensiveness is increased in order. An operation thereof will be described.

FIG. 13 is a diagram illustrating a data structure of a synonym list.

When a search query is input in the use phase, a synonym list is generated according to the input search query. The synonym list is stored in the related word storage unit 140. In the synonym list, a similarity between a word and a word of the search query is stored in association with each word. The synonym list is sorted in descending order of the similarity.

In the example of FIG. 11, since the value of the slider 302 is 0.7 and the first reference value is also 0.7, the synonyms such as "bike", "taxi", and "bus" are selected. In the example of FIG. 12, since the value of the slider 302 is 0.6 and the first reference value is also 0.6, the synonyms such as "truck", "transportation", and "railway" are added.

FIG. 14 is a diagram illustrating a data structure of a business characteristic word list.

When a search query is input in the use phase, a business characteristic word list is generated according to the input search query. The business characteristic word list is stored in the related word storage unit 140. In the business characteristic word list, a similarity between a business characteristic word and a word of the search query is stored in association with each business characteristic word. The business characteristic word list is sorted in descending order of the similarity.

In the example of FIG. 11, since the first reference value is also 0.7, the business characteristic words such as "second-hand", "repair", and "high class" are selected. In the example of FIG. 12, since the first reference value is also 0.6, the business characteristic words such as "quality", "public", and "new product" are added.

FIG. 15 is a diagram illustrating a data structure of a business type list.

When a search query is input in the use phase, a business type list is generated according to the input search query. The business type list is stored in the related word storage unit 140. In the business type list, a similarity between a business type and a word of the search query is stored in association with each business type. The business type list is sorted in descending order of the similarity.

In the example of FIG. 11, since the first reference value is also 0.7, the business types such as "car sales business", "car maintenance business", and "car rental business" are selected. In the example of FIG. 12, since the first reference value is also 0.6, the business types such as "car manufacturing business", "transportation business", and "real estate business" are added.

Figure 16:
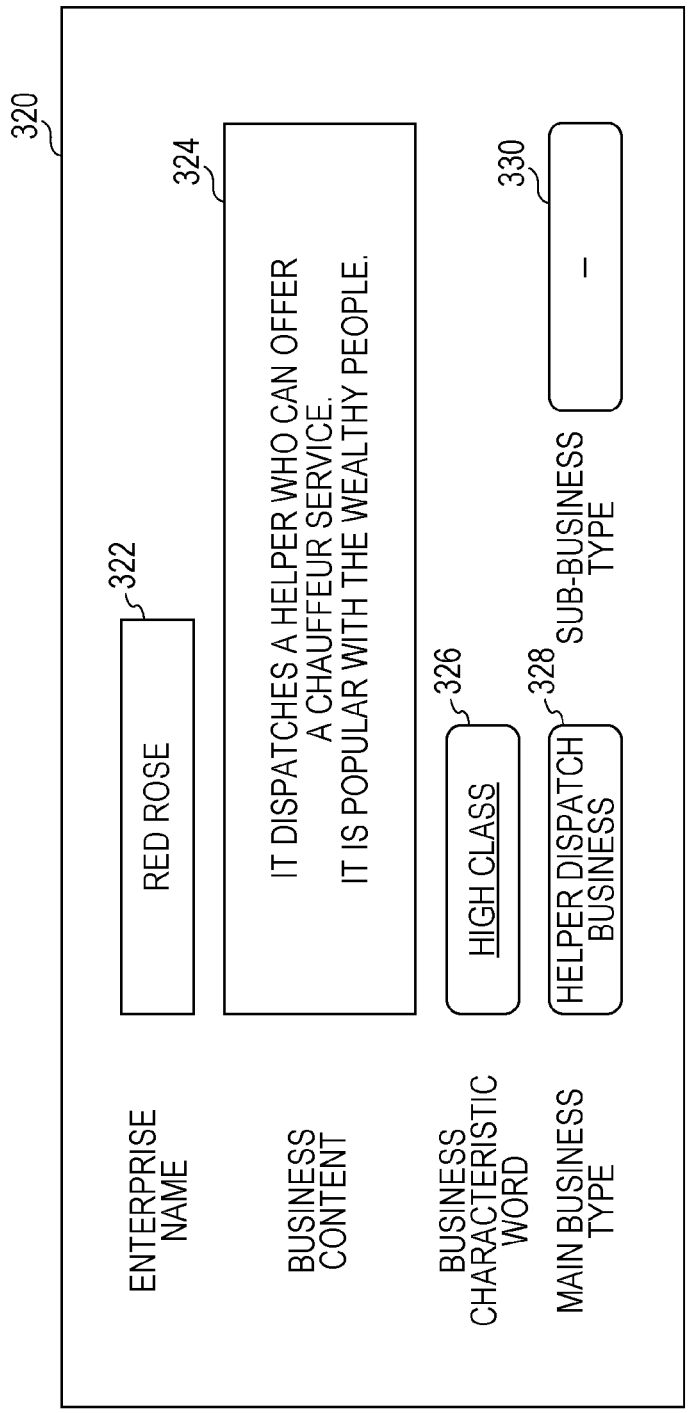
FIG. 16 is a diagram illustrating an enterprise information box included in a search result screen.

FIG. 16 is a diagram illustrating an enterprise information box included in a search result screen in the state of FIG. 11.

In this case, since a string of a business characteristic word "high class", which is similar to the word of the search query, matches the business characteristic word name, enterprise information related thereto is displayed as a search result. The string of "high class" is hit even in a case where it is included in the business content sentence, the main business type name, or the sub-business type name. That is, the business content sentence, the main business type name, or the sub-business type name is also in a search range. However, the business content sentence, the main business type name, or the sub-business type name may not be in the search range.

Figure 17:
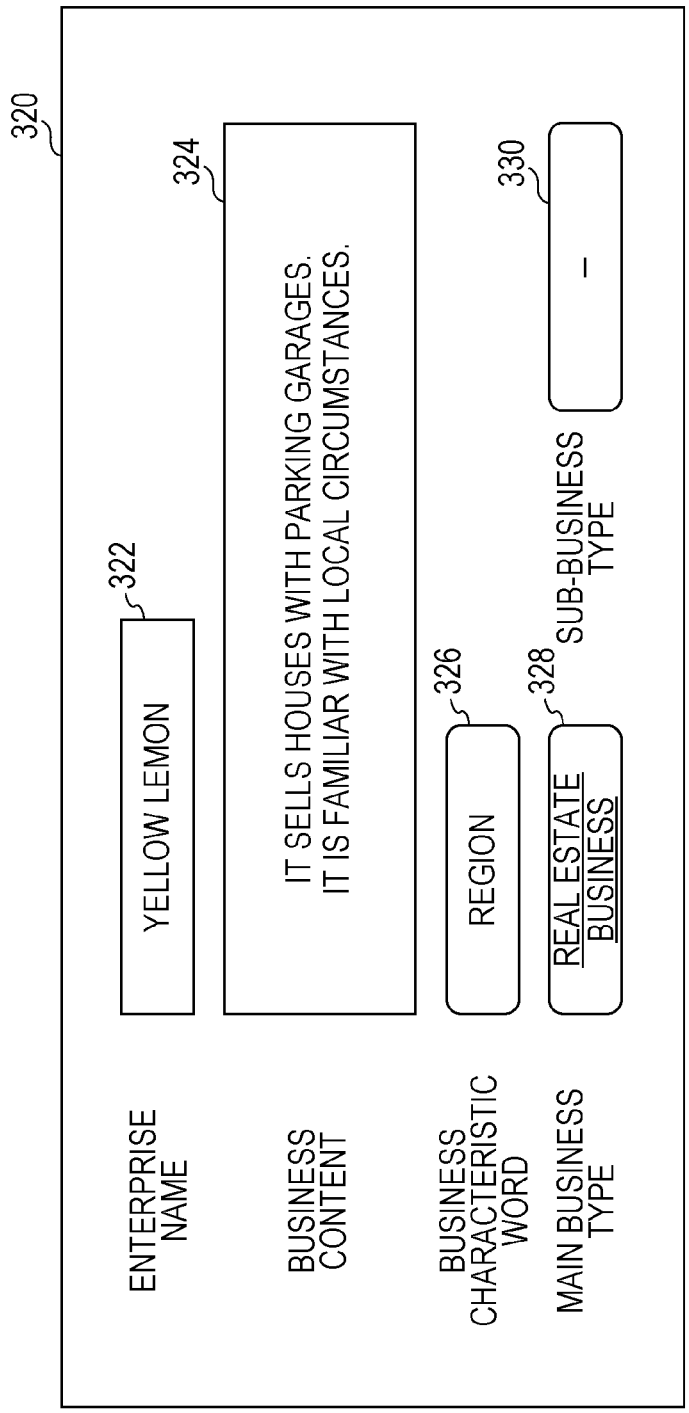
FIG. 17 is a diagram illustrating an enterprise information box included in a search result screen.

FIG. 17 is a diagram illustrating an enterprise information box included in a search result screen in the state of FIG. 12.

In this case, since a string of a business type of "real estate business", which is similar to the word of the search query, matches the main business type name, enterprise information related thereto is displayed as a search result. The string of "real estate business" is hit even in a case where it is included in the business content sentence, the business characteristic word, or the sub-business type name. That is, the business content sentence, the business characteristic word, or the sub-business type name is also in a search range. However, the business content sentence, the business characteristic word, or the sub-business type name may not in the search range.

An operation example based on these screen examples will be described. For example, it is assumed that an insurer who wants to find a new candidate for car insurance uses this search system. The insurer inputs "car" as an initial search query and obtains the search result of FIG. 10. The car dealer illustrated in FIG. 10 is unlikely to be a new trade route. This is because a recommendation of car insurance through a car dealer has been previously widely carried out.

Therefore, the re-searched enterprise information of FIG. 16 is obtained by increasing comprehensiveness through the operation of the slider 302 as in FIG. 11. The enterprise information of "Red Rose" does not include the string of "car", but is practically associated with "car" via the business characteristic word "high class" highly associated with "car". The insurer reads the business content of "Red Rose" and considers that a helper who is dispatched by "Red Rose" may prepare a large amount of compensation in case of having an accident while driving a wealthy customer's high class car. Therefore, the insurer realizes that they can offer an insurance contract to "Red Rose".

Next, the re-searched enterprise information of FIG. 17 is obtained by increasing comprehensiveness through the operation of the slider 302 as in FIG. 12. The enterprise information of "Yellow Lemon" does not include the string of "car", but is practically associated with "car" via the business type "real estate business" highly associated with "car". The insurer reads the business content of "Yellow Lemon" and considers that a resident surely has a car because the resident purchased a house with a parking garage. In addition, the insurer assumes that since the resident is not familiar with local transportation circumstances and has few acquaintances in that region, the resident selects the dealer who is familiar with local circumstances. Accordingly, the insurer realizes that if the resident is worried about having an accident in an unknown region and having a problem with neighbors, this motivates the resident to sign up for insurance. Therefore, clues for expanding business are gradually found.

In this case, it is difficult for the insurer to consider that "high class" or "real estate business" is a key of the business expansion. However, according to the present exemplary embodiment, the insurer can find target enterprise information from the common word "car".

Since descriptions written by humans have many orthographic errors and comprehensiveness of tag information given manually is not guaranteed in some cases, the search is supported by the present exemplary embodiment, such that the comprehensiveness can be complemented. Hereinafter, the processing will be described in detail.

Figure 18:
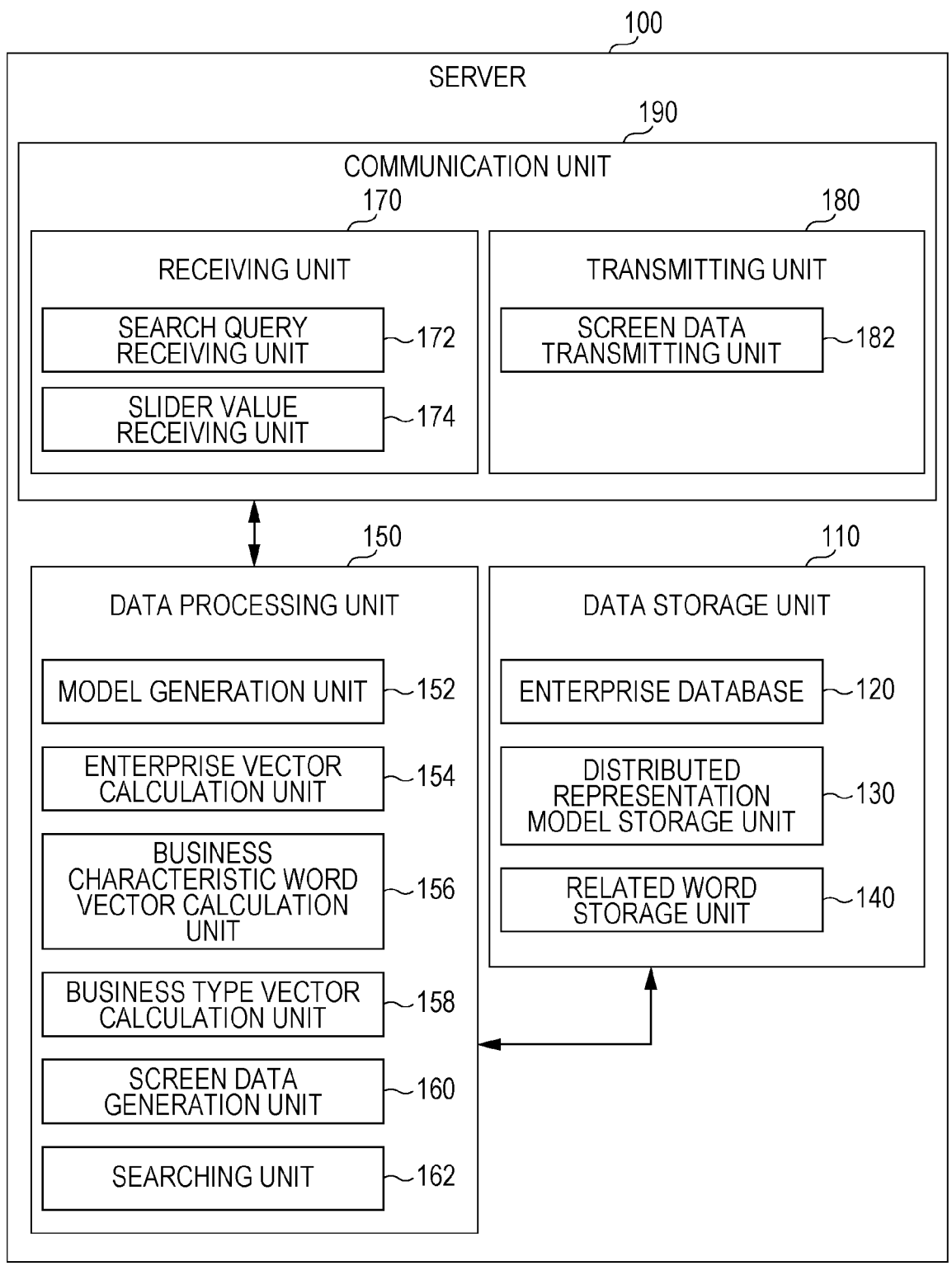
FIG. 18 is a functional block diagram of the server.

FIG. 18 is a functional block diagram of the server 100. Components of the server 100 include hardware including a computer such as a central processing unit (CPU) and various types of coprocessors, a storage device called a memory or a storage, and a wired or wireless communication line that links the computer and the storage device, and software that is stored in the storage device and supplies a processing command to the computer. A computer program may be implemented by a device driver, an operating system, various application programs positioned on an upper layer thereof, and a library that provides a common function to the programs. Each block illustrated indicates a functional unit block rather than a hardware unit configuration.

The server 100 includes a data storage unit 110, a data processing unit 150, and a communication unit 190. The communication unit 190 performs communication processing via the network. The data storage unit 110 stores various types of data. The data processing unit 150 executes various types of processing based on data acquired by the communication unit 190 and data stored in the data storage unit 110. The data processing unit 150 also functions as an interface of the communication unit 190 and the data storage unit 110.

The communication unit 190 includes a transmitting unit 180 that transmits data and a receiving unit 170 that receives data.

The transmitting unit 180 includes a screen data transmitting unit 182 that transmits various types of screen data. The receiving unit 170 includes a search query receiving unit 172 and a slider value receiving unit 174. The search query receiving unit 172 receives a search query. The slider value receiving unit 174 receives a slider value.

The data processing unit 150 includes a model generation unit 152, an enterprise vector calculation unit 154, a business characteristic word vector calculation unit 156, a business type vector calculation unit 158, a screen data generation unit 160, and a searching unit 162.

The model generation unit 152 executes distributed representation model generation processing that calculates the word vector. The enterprise vector calculation unit 154 executes enterprise vector calculation processing. The business characteristic word vector calculation unit 156 executes business characteristic word vector calculation processing. The business type vector calculation unit 158 executes business type vector calculation processing. The screen data generation unit 160 generates various types of screen data. The searching unit 162 performs a search for enterprise information.

The data storage unit 110 includes the enterprise database 120, the distributed representation model storage unit 130, and the related word storage unit 140.

Figure 19:
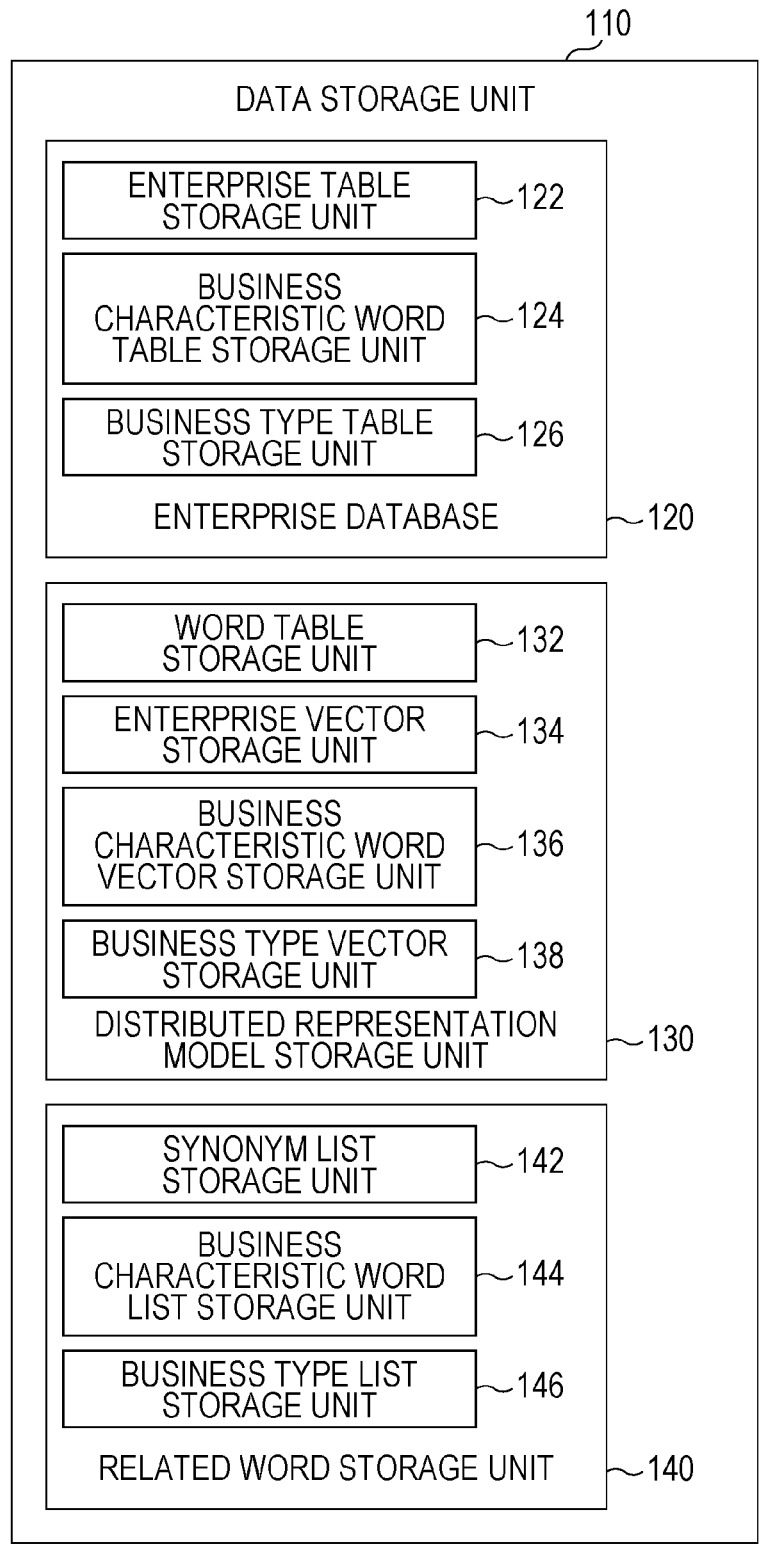
FIG. 19 is a functional block diagram of a data storage unit.

FIG. 19 is a functional block diagram of the data storage unit 110.

The enterprise database 120 includes an enterprise table storage unit 122, a business characteristic word table storage unit 124, and a business type table storage unit 126. The enterprise table storage unit 122 stores an enterprise table (FIG. 2). The business characteristic word table storage unit 124 stores a business characteristic word table (FIG. 3). The business type table storage unit 126 stores a business type table (FIG. 4).

The distributed representation model storage unit 130 includes a word table storage unit 132, an enterprise vector storage unit 134, a business characteristic word vector storage unit 136, and a business type vector storage unit 138.

The word table storage unit 132 stores a word table (FIG. 5). The enterprise vector storage unit 134 has been described with reference to FIG. 6. The business characteristic word vector storage unit 136 has been described with reference to FIG. 7. The business type vector storage unit 138 has been described with reference to FIG. 8.

The related word storage unit 140 includes a synonym list storage unit 142, a business characteristic word list storage unit 144, and a business type list storage unit 146.

The synonym list storage unit 142 stores a synonym list (FIG. 13). The business characteristic word list storage unit 144 stores a business characteristic word list (FIG. 14). The business type list storage unit 146 stores a business type list (FIG. 15).

Figure 20:
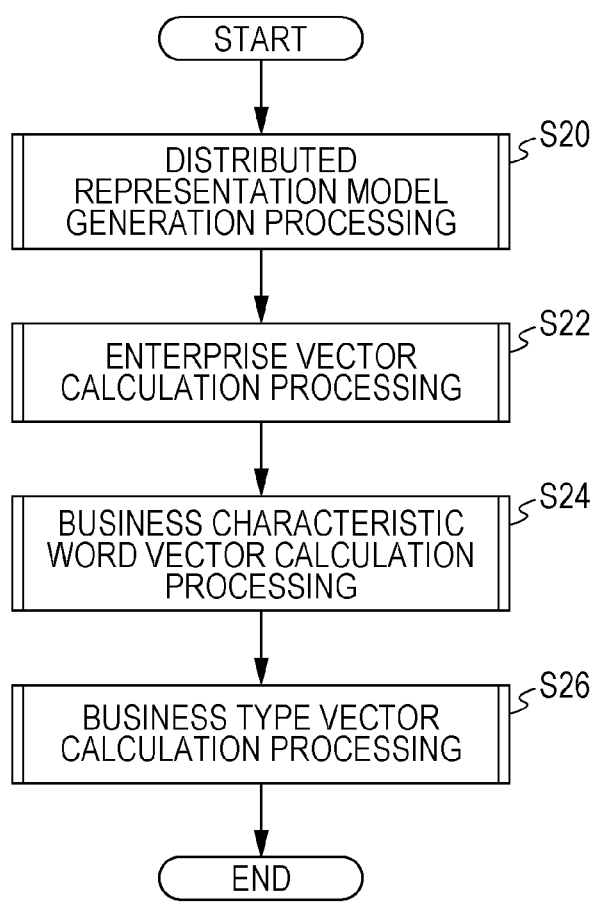
FIG. 20 is a flowchart illustrating a procedure of preparation phase processing.

FIG. 20 is a flowchart illustrating a procedure of preparation phase processing.

First, the model generation unit 152 executes distributed representation model generation processing (S20). In the distributed representation model generation processing, a word table is generated as a distributed representation model (FIG. 5). The distributed representation model generation processing will be described later with reference to FIG. 21.

Next, the enterprise vector calculation unit 154 executes enterprise vector calculation processing (S22). The enterprise vector calculation processing will be described later with reference to FIG. 22.

Subsequently, the business characteristic word vector calculation unit 156 executes business characteristic word vector calculation processing (S24). The business characteristic word vector calculation processing will be described later with reference to FIG. 23.

Finally, the business type vector calculation unit 158 executes business type vector calculation processing (S26). The business type vector calculation processing will be described later with reference to FIG. 24.

Figure 21:
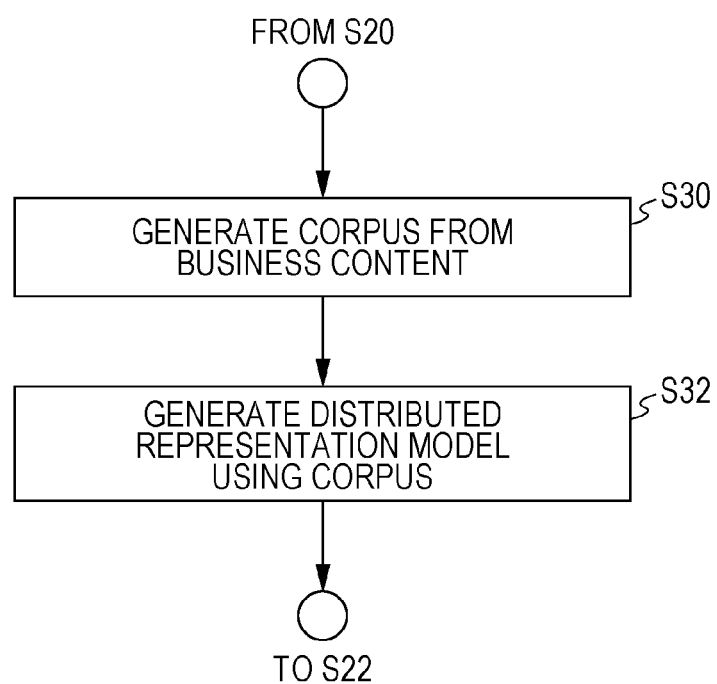
FIG. 21 is a flowchart illustrating a procedure of distributed representation model generation processing.

FIG. 21 is a flowchart illustrating a procedure of distributed representation model generation processing.

The model generation unit 152 generates a corpus from the enterprise table (S30). The corpus is large-scale data of structured sentences of a natural language. The corpus is stored in the data storage unit 110. Specifically, the model generation unit 152 performs a morpheme analysis on each sentence extracted from the business content sentence of each enterprise, and converts the analyzed sentence into a word spacing format. The word spacing is a string obtained by separating the words with blank spaces. The word spacing format data is a corpus.

The model generation unit 152 generates a word vector using a corpus (S32). Specifically, the model generation unit 152 calculates a word vector relating to each word included in the corpus by a learning process of Word2vec, for example. The generated word vector is stored in the word table storage unit 132. Then, the processing returns to S22.

Figure 22:
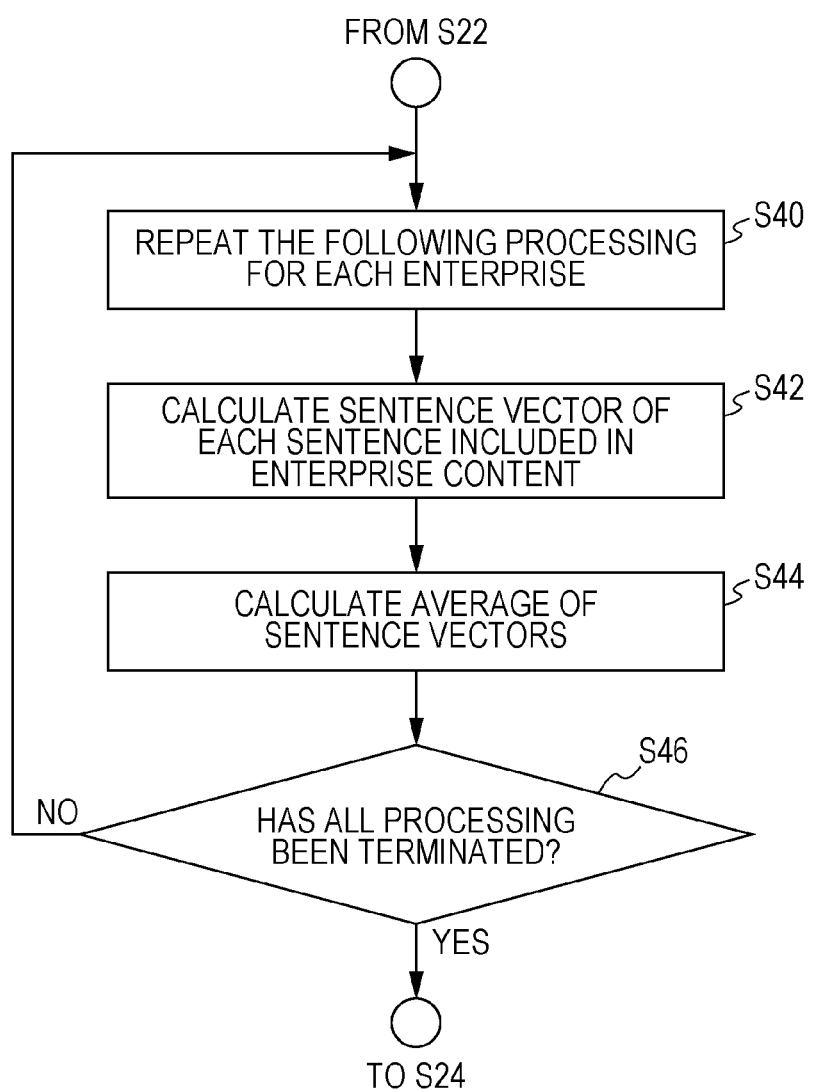
FIG. 22 is a flowchart illustrating a procedure of enterprise vector calculation processing.

FIG. 22 is a flowchart illustrating a procedure of enterprise vector calculation processing.

The enterprise vector calculation unit 154 repeats the following processing for each enterprise (S40). The enterprise vector calculation unit 154 calculates a sentence vector of each sentence included in the business content sentence of the enterprise (S42). The sentence vector is generated from the word vector of the word included in the sentence. A generation method is, for example, an averaging method. That is, the sentence vector is an average of the word vectors.

The enterprise vector calculation unit 154 calculates an average of the sentence vectors of each sentence included in the business content sentence, and the calculated average vector is defined as a business vector (S44). The enterprise vector calculation unit 154 may generate an enterprise vector from the sentence vector by a method other than the averaging method. The calculated enterprise vector is stored in the enterprise vector storage unit 134.

If any enterprise that has not been processed remains (N in S46), the processing of the enterprise vector calculation unit 154 returns to S40. If the processing for all enterprises has been terminated (Y in S46), the processing returns to S24.

Figure 23:
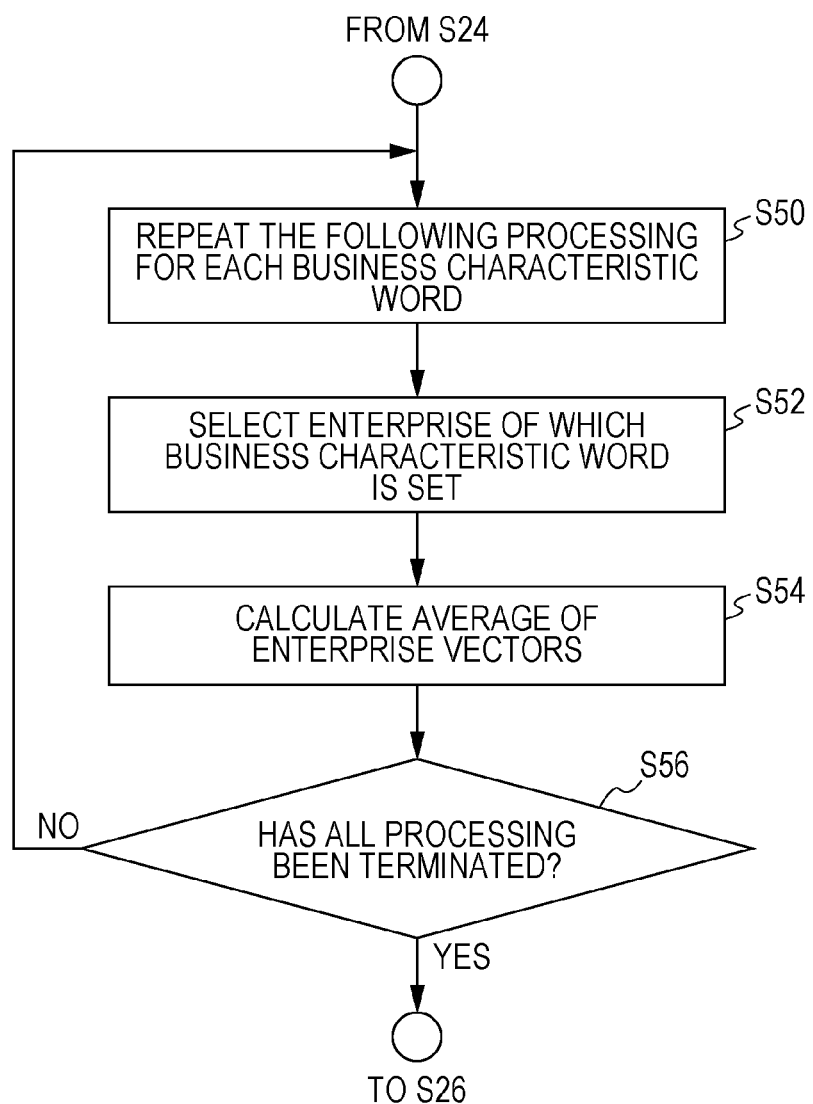
FIG. 23 is a flowchart illustrating a procedure of business characteristic word vector calculation processing.

FIG. 23 is a flowchart illustrating a procedure of business characteristic word vector calculation processing.

The business characteristic word vector calculation unit 156 repeats the following processing for each business characteristic word (S50). The business characteristic word vector calculation unit 156 selects an enterprise set by the business characteristic word with reference to the enterprise table (S52).

The business characteristic word vector calculation unit 156 calculates an average of the selected enterprise vectors, and the calculated average vector is defined as a business characteristic word vector of the business characteristic word (S54). The business characteristic word vector calculation unit 156 may generate a business characteristic word vector from the enterprise vector by a method other than the averaging method. The calculated business characteristic word vector is stored in the business characteristic word vector storage unit 136.

If any business characteristic word that has not been processed remains (N in S56), the processing of the business characteristic word vector calculation unit 156 returns to S50. If the processing for all business characteristic words has been terminated (Y in S56), the processing returns to S26.

Figure 24:
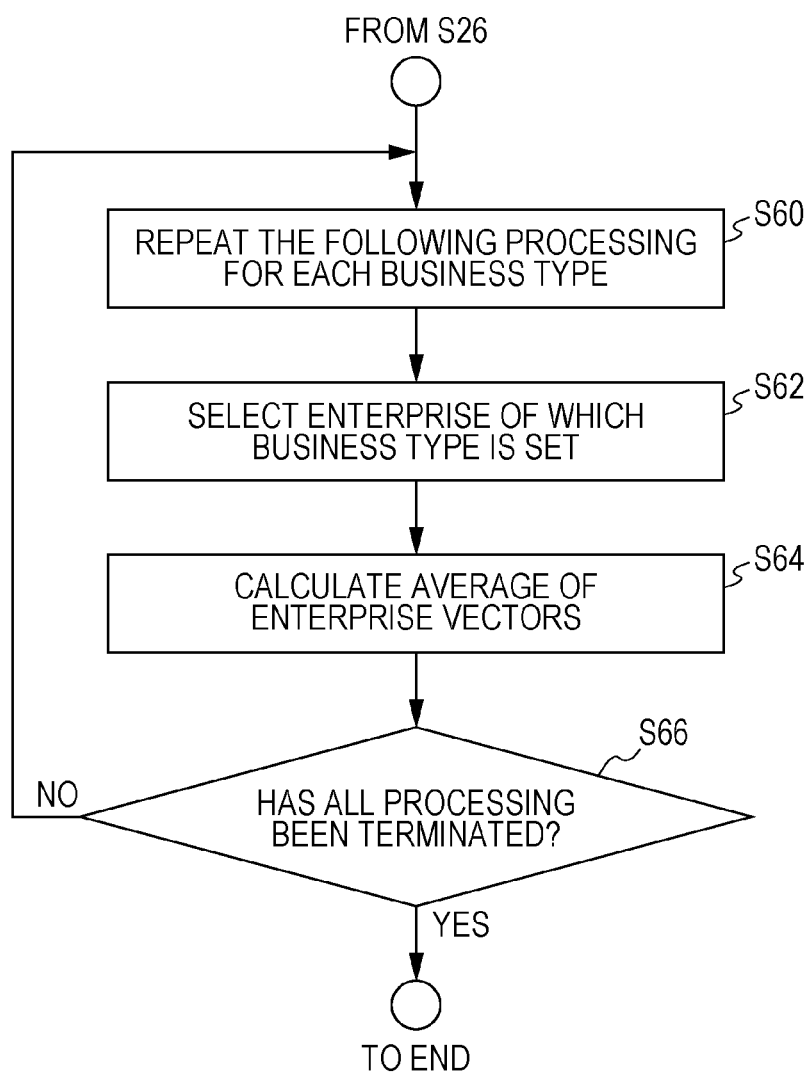
FIG. 24 is a flowchart illustrating a procedure of business type vector calculation processing.

FIG. 24 is a flowchart illustrating a procedure of business type vector calculation processing.

The business type vector calculation unit 158 repeats the following processing for each business type (S60). The business type vector calculation unit 158 selects an enterprise set by the business type with reference to the enterprise table (S62).

The business type vector calculation unit 158 calculates an average of the selected enterprise vectors, and the calculated average vector is defined as a business type vector of the business type. The business type vector calculation unit 158 may generate a business type vector from the business vector by a method other than the averaging method. The calculated business type vector is stored in the business type vector storage unit 138.

If any business type that has not been processed remains (N in S66), the processing of the business type vector calculation unit 158 returns to S60. If the processing for all business types has been terminated (Y in S66), the preparation phase processing is terminated.

Figure 25:
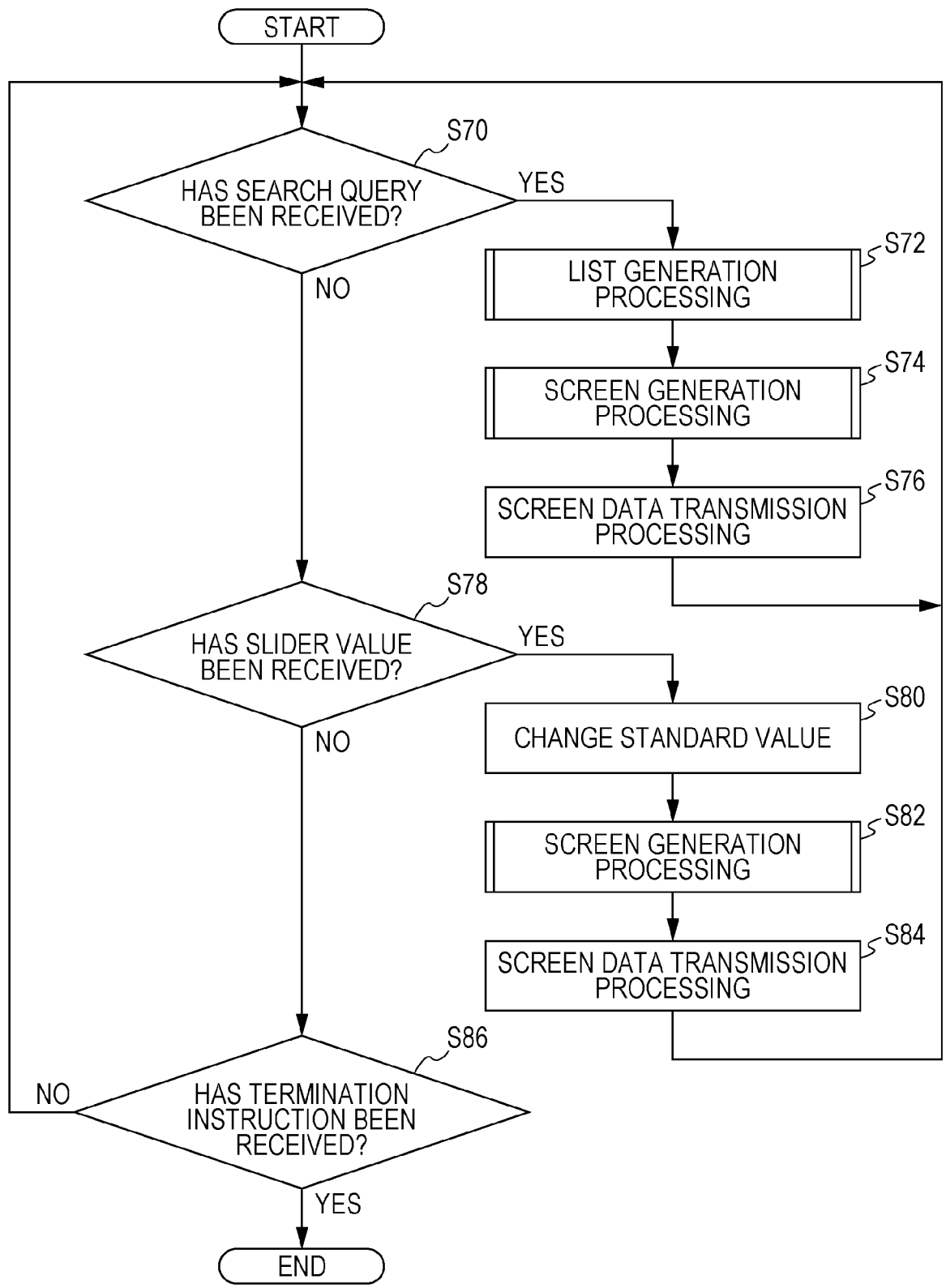
FIG. 25 is a flowchart illustrating a procedure of use phase processing.

FIG. 25 is a flowchart illustrating a procedure of use phase processing.

If the search query receiving unit 172 receives a search query from the user terminal 200 that displays the search query input screen (Y in S70), the screen data generation unit 160 executes list generation processing (S72). In the list generation processing, the synonym list (FIG. 13), the business characteristic word list (FIG. 14), and the business type list (FIG. 15) are generated. The list generation processing will be described later with reference to FIG. 26.

Next, the screen data generation unit 160 executes screen generation processing (S74). In the screen generation processing, the synonym, the business characteristic word, and the business type are displayed again on the search query input screen. Then, a search for enterprise information is performed, and the search result screen is displayed. The screen generation processing will be described later with reference to FIG. 27.

Subsequently, the screen data transmitting unit 182 transmits screen data to the user terminal 200 in screen data transmission processing (S76). Then, the processing returns to S70. The user terminal 200 displays the search query input screen and the search result screen based on the received screen data.

If the slider value receiving unit 174 receives a slider value from the user terminal 200 that displays the search query input screen (Y in S78), the first reference value, the second reference value, and the third reference value are changed based on the slider value. In this case, the slider value is used as a new first reference value, second reference value, and third reference value as it is.

If the first reference value, the second reference value, and the third reference value are changed, the screen data generation unit 160 executes screen generation processing based on the changed first reference value, second reference value, and third reference value (S82). In addition, the screen data transmitting unit 182 transmits re-generated screen data in the screen data transmission processing (S84). The user terminal 200 displays the search query input screen and the search result screen based on the received screen data. Then, the processing returns to S70.

If a termination instruction is received from the user terminal 200 (Y in S86), the use phase processing is terminated. If the termination instruction is not received from the user terminal 200, the processing returns to S70.

Figure 26:
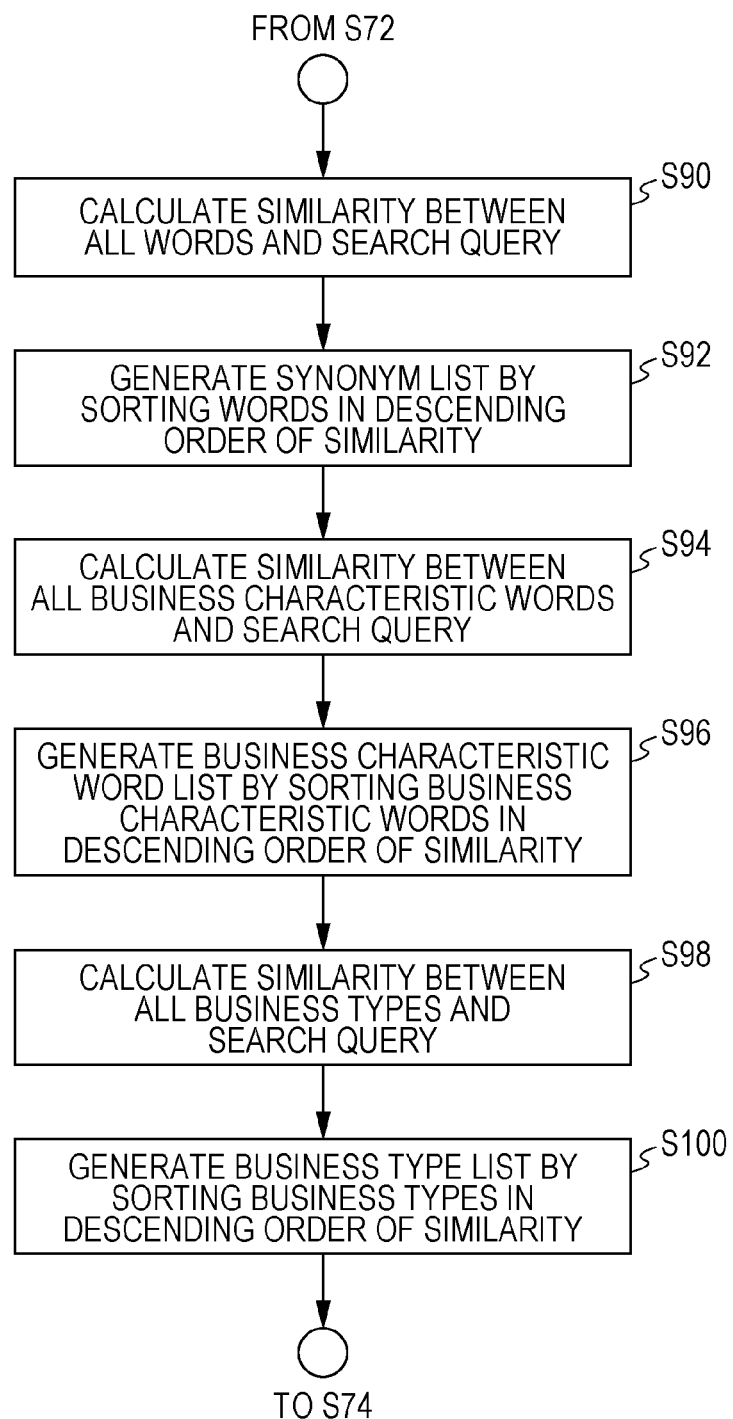
FIG. 26 is a flowchart illustrating a procedure of list generation processing.

FIG. 26 is a flowchart illustrating a procedure of list generation processing.

The screen data generation unit 160 calculates a similarity between all the words and the search query (S90). When a search query is a word, a word vector of the word is defined as a meaning vector of the search query. When a search query is a phrase, a meaning vector of the search query is generated from word vectors of words included in the phrase. The generation method is, for example, an averaging method. Then, a similarity between the word vector of each word and the meaning vector of the search query is calculated. The screen data generation unit 160 calculates, for example, a cosine similarity. This is also applied to the following similarity.

The screen data generation unit 160 generates a synonym list by sorting words in descending order of the similarity (S92). The generated synonym list is stored in the synonym list storage unit 142.

The screen data generation unit 160 calculates a similarity between all the business characteristic words and the search query (S94). Specifically, the screen data generation unit 160 calculates a similarity between a business characteristic word vector of each business characteristic word and a meaning vector of the search query.

The screen data generation unit 160 generates a business characteristic word list by sorting business characteristic words in descending order of the similarity (S96). The generated business characteristic word list is stored in the business characteristic word list storage unit 144.

The screen data generation unit 160 calculates a similarity between all the business types and the search query (S98). Specifically, the screen data generation unit 160 calculates a similarity between a business type vector of each business type and a meaning vector of the search query.

The screen data generation unit 160 generates a business type list by sorting business types in descending order of the similarity (S100). The generated business type list is stored in the business type list storage unit 146. Then, the processing returns to S74.

Figure 27:
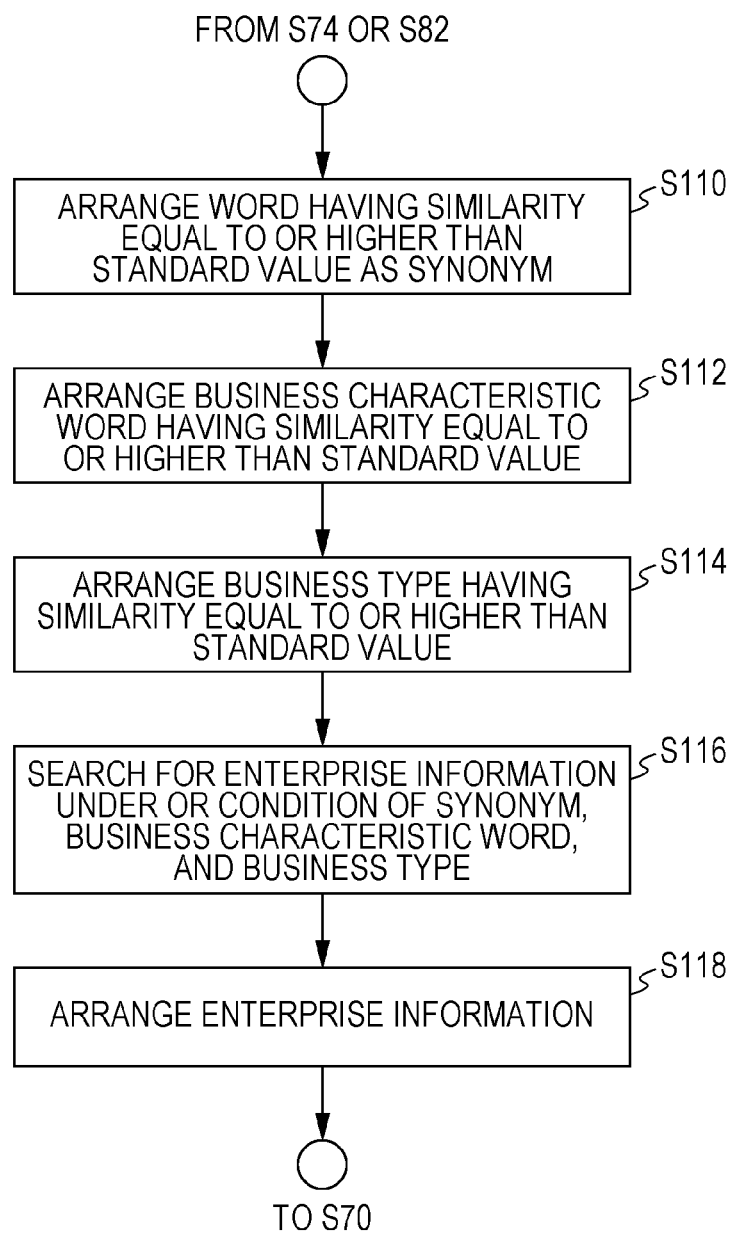
FIG. 27 is a flowchart illustrating a procedure of screen generation processing.

FIG. 27 is a flowchart illustrating a procedure of screen generation processing.

The screen data generation unit 160 arranges a synonym having a similarity equal to or higher than the first reference value in the display area 304 for a synonym on the search query input screen (S110). The screen data generation unit 160 arranges a business characteristic word having a similarity equal to or higher than the second reference value in the display area 306 fora business characteristic word on the search query input screen (S112). In addition, the screen data generation unit 160 arranges a business type having a similarity equal to or higher than the third reference value in the display area 308 for a business type on the search query input screen (S114).

The screen data generation unit 160 searches for enterprise information under an OR condition of the synonym, the business characteristic word, and the business type (S116). For example, a new search query is generated as a string searching for the synonym, the business characteristic word, and the business type, and the new search query is input to a database management system. The database management system selects corresponding enterprise information by using enterprise information (a set of texts representing the business content sentence, the business characteristic word, the main business type, and the sub-business type) for each enterprise as a comparison object. The database management system is software that manages and operates the enterprise database 120.

The screen data generation unit 160 arranges the business information box representing the hit enterprise information on the search result screen (S118). Then, the processing returns to S70.

Modification

Unnecessary words among the synonym, the business characteristic word, and the business type displayed on the search query input screen may be deleted. When deletion of the unnecessary synonym, business characteristic word, or business type is instructed by the user operation, a deletion request of the synonym, the business characteristic word, or the business type is transmitted from the user terminal 200 to the server 100. When a request receiving unit (not illustrated) of the server 100 receives the deletion request, a deletion unit (not illustrated) deletes the unnecessary synonym, business characteristic word, or business type from the synonym list, the business characteristic wordlist, or the business type list. Then, the server 100 performs list generation processing, screen generation processing, and screen data transmission processing again.

Although the example in which a search for enterprise information is automatically performed in conjunction with the reception of the search query has been illustrated, the search for enterprise information may be performed after an instruction of search execution is received by a user operation.

The screen data generation unit 160 may arrange a similarity between a search query and the synonym next to the synonym on the search query input screen. The screen data generation unit 160 may arrange a similarity between a search query and the business characteristic word next to the business characteristic word on the search query input screen. The screen data generation unit 160 may arrange a similarity between a search query and the business type next to the business type on the search query input screen.

Although the example in which the search query input screen and the search result screen are displayed in parallel with each other is described, the search query input screen and the search result screen may be switched and displayed.

The server 100 may convert the slider value to calculate the first reference value, the second reference value, and the third reference value. In addition, the first reference value, the second reference value, and the third reference value may be different values. For example, the screen data generation unit 160 calculates the first reference value, the second reference value, and the third reference value so that these values are associated with the slider value. The screen data generation unit 160 may calculate the first reference value by multiplying the slider value by a first coefficient.

The screen data generation unit 160 may calculate the second reference value by multiplying the slider value by a second coefficient. The screen data generation unit 160 may calculate the third reference value by multiplying the slider value by a third coefficient.

In the averaging of vectors, weighting of each original word vector, phase vector, or sentence vector may be performed by using, for example, an average index such as term frequency-inverse document frequency (TF-IDF).

Although the example in which the search for enterprise information is performed has been described, a search for other types of information may be performed. For example, in a case where a search for product information is performed in an e-commerce site, a product classification vector or a product characteristic vector may be calculated by using tags for product classifications or tags for product characteristics attached to product introduction sentences. Then, a search condition may be complemented by using the product classification vector or the product characteristic vector that is similar to a search query.

For example, in a case where a search for a patent document is performed in a patent document browsing site, a patent classification vector may be calculated by using tags for patent classifications attached to patent documents. Then, a search condition may be complemented by using the patent classification vector similar to a search query.

For example, in a case where a search for a posted article is performed in a posting site such as social networking service (SNS), an article classification vector may be calculated by using tags for article classifications such as hash tags attached to posted articles. Then, a search condition may be complemented by using the article classification vector similar to a search query.

The present invention is not limited to only the above-described exemplary embodiments and modifications, and can be embodied by modifying the components without departing from the gist thereof. Various inventions can be formed through appropriate combinations of the plurality of components disclosed in the above-mentioned exemplary embodiments and modifications. Furthermore, some components may be deleted from the entire components disclosed in the above-mentioned exemplary embodiments and modifications.

What is claimed is:

1. A natural language processing apparatus comprising:
   a processor; and
   a storage device coupled to the processor,
   wherein the storage device comprises an enterprise database in which an enterprise, a business content sentence, a business characteristic word and a business type are associated with each other,
   the processor:
      generates an enterprise vector from a word vector of a word included in the business content sentence stored in the enterprise database;
      generates a business characteristic word vector from the enterprise vector of the enterprise that is associated with the business characteristic word in the enterprise database; and
      generates a business type vector from the enterprise vector of the enterprise that is associated with the business type in the enterprise database,
   upon receiving a search query, the processor:
      extracts a synonym having a word vector with a similarity, that is equal to or higher than a first reference value, with a word vector of the search query;

extracts the business characteristic word having the business characteristic word vector with a similarity, that is equal to or higher than a second reference value, with the word vector of the search query or the word vector of the synonym;

extracts the business type having the business type vector with a similarity, that is equal to or higher than a third reference value, with the word vector of the search query or the word vector of the synonym; and extracts, from the enterprise database, enterprise information including at least one of the search query, the extracted synonym, the extracted business characteristic word or the extracted business type in at least one of the business content sentence, the business characteristic word or the business type.

2. The natural language processing apparatus according to claim 1, wherein the processor further outputs at least one of the extracted synonym, the extracted business characteristic word or the extracted business type.

3. The natural language processing apparatus according to claim 2, wherein the processor further extracts a plurality of synonyms, a plurality of business characteristic words or a plurality of business types, and outputs the plurality of extracted synonyms, the plurality of extracted business characteristic words or the plurality of extracted business types arranged in order of the similarity.

4. The natural language processing apparatus according to claim 3, wherein the processor outputs at least one of:

the similarity between the word vector of the synonym and the word vector of the search query;

the similarity between the business characteristic word vector of the business characteristic word and the word vector of the search query or the word vector of the synonym; or the similarity between the business type vector of the business type and the word vector of the search query or the word vector of the synonym.

5. A non-transitory medium comprising an enterprise database in which an enterprise, a business content sentence, a business characteristic word and a business type are associated with each other, and storing a program causing an information processing apparatus to execute:

generating an enterprise vector from a word vector of a word included in the business content sentence stored in the enterprise database;

generating a business characteristic word vector from the enterprise vector of the enterprise that is associated with the business characteristic word in the enterprise database; and generating a business type vector from the enterprise vector of the enterprise that is associated with the business type in the enterprise database, wherein, upon the information processing apparatus receives a search query, the program causes the information processing apparatus to execute:

extracting a synonym having a word vector with a similarity, that is equal to or higher than a first reference value, with a word vector of the search query;

extracting the business characteristic word having the business characteristic word vector with a similarity, that is equal to or higher than a second reference value, with the word vector of the search query or the word vector of the synonym;

extracting the business type having the business type vector with a similarity, that is equal to or higher than a third reference value, with the word vector of the search query or the word vector of the synonym; and extracting, from the enterprise database, enterprise information including at least one of the search query, the extracted synonym, the extracted business characteristic word or the extracted business type in at least one of the business content sentence, the business characteristic word or the business type.

\* \* \* \* \*